(12) United States Patent
Weidmann et al.

(10) Patent No.: US 11,593,159 B2
(45) Date of Patent: Feb. 28, 2023

(54) EXTERNAL EXCEPTION HANDLING

(71) Applicant: ARM LIMITED, Cambridge (GB)

(72) Inventors: Martin Weidmann, Cambridge (GB); Timothy Nicholas Hay, Cambridge (GB); Marc Zyngier, Cambridge (GB)

(73) Assignee: Arm Limited, Cambridge (GB)

( * ) Notice: Subject to any disclaimer, the term of this patent is extended or adjusted under 35 U.S.C. 154(b) by 238 days.

(21) Appl. No.: 16/977,580

(22) PCT Filed: Feb. 28, 2019

(86) PCT No.: PCT/GB2019/050553
§ 371 (c)(1),
(2) Date: Sep. 2, 2020

(87) PCT Pub. No.: WO2019/171025
PCT Pub. Date: Sep. 12, 2019

(65) Prior Publication Data
US 2020/0409753 A1 Dec. 31, 2020

(30) Foreign Application Priority Data
Mar. 5, 2018 (GB) ...................................... 1803521

(51) Int. Cl.
*G06F 9/48* (2006.01)
*G06F 9/455* (2018.01)
*G06F 9/50* (2006.01)

(52) U.S. Cl.
CPC ........ *G06F 9/4881* (2013.01); *G06F 9/45558* (2013.01); *G06F 9/4812* (2013.01);
(Continued)

(58) Field of Classification Search
CPC .. G06F 9/4881; G06F 9/45558; G06F 9/4812; G06F 9/5077; G06F 2009/45575; G06F 2009/45583
See application file for complete search history.

(56) References Cited

U.S. PATENT DOCUMENTS

2009/0307436 A1* 12/2009 Larson ................ G06F 11/0745
714/49
2011/0197003 A1 8/2011 Serebrin et al.
(Continued)

OTHER PUBLICATIONS

Eric Bost; Hardware Support for Robust Partitioning in Freescale QorIQ Multicore SoCs (P4080 and derivatives); May 2013 (Year: 2013).*
(Continued)

*Primary Examiner* — Dong U Kim
(74) *Attorney, Agent, or Firm* — Nixon & Vanderhye P.C.

(57) ABSTRACT

There is provided a data processing apparatus that includes processing circuitry for executing instructions relating to an active virtual processor in a plurality of virtual processors. Exception control circuitry receives an external exception associated with a target virtual processor in the plurality of virtual processors and when the target virtual processor is other than the active virtual processor, it issues a doorbell exception to cause a scheduling operation to schedule the target virtual processor to be the active virtual processor. Storage circuitry stores an indication of a set of masked virtual processors and the scheduling operation is adapted to disregard doorbell exceptions in respect of the set of masked virtual processors.

13 Claims, 8 Drawing Sheets

(52) U.S. Cl.
CPC .. *G06F 9/5077* (2013.01); *G06F 2009/45575* (2013.01); *G06F 2009/45583* (2013.01)

(56) References Cited

U.S. PATENT DOCUMENTS

| | | | |
|---|---|---|---|
| 2014/0164662 A1 | 6/2014 | Van Schaik | |
| 2016/0124766 A1* | 5/2016 | Dong | G06F 9/45558 718/1 |
| 2016/0140062 A1* | 5/2016 | Moyer | G06F 13/4068 710/267 |
| 2016/0140063 A1* | 5/2016 | Moyer | G06F 13/24 710/267 |
| 2016/0162292 A1* | 6/2016 | Bugnion | G06F 9/3005 712/245 |
| 2016/0306645 A1 | 10/2016 | Serebrin | |
| 2016/0328272 A1* | 11/2016 | Ahmed | G06F 9/4881 |

OTHER PUBLICATIONS

International Search Report for PCT/GB2019/050553 dated Apr. 12, 2019, 3 pages.
Written Opinion of the ISA for PCT/GB2019/050553 dated Apr. 12, 2019, 10 pages.
GB Search Report for GB1803521.2 dated Sep. 18, 2018, 5 pages.

\* cited by examiner

EXTERNAL EXCEPTION HANDLING

This application is the U.S. national phase of International Application No. PCT/GB2019/050553 filed Feb. 28, 2019 which designated the U.S. and claims priority to GB Patent Application No. 1803521.2 filed Mar. 5, 2018, the entire contents of each of which are hereby incorporated by reference.

The present technique relates to data processing.

Some data processing systems utilise virtual processors. These represent a particular processor state that can be taken on by a real physical processor in order to execute a series of instructions. After a period of execution (or when the processor waits for an event to occur), the virtual processor is suspended, thereby causing its state to be saved. A different virtual processor can then be activated by loading its state into the physical processor. This allows the isolation of different tasks and can improve efficiency by making use of time when a physical processor would otherwise be idle. The occurrence of an event can be represented by an exception. When such an exception is received, if the management system determines that it relates to event for which a virtual processor has been waiting, then a doorbell exception can be raised, which causes the suspended virtual processor to be scheduled for activation. In practice, however, such a process can reduce overall efficiency when multiple exceptions relating to the same virtual processor are raised. Furthermore, the procedure for disabling and enabling the generation of doorbell exceptions altogether for a virtual processor can require restricted resources to be accessed, which can also reduce overall efficiency. It would therefore be desirable to provide a system in which exceptions associated with virtual processors have a limited effect on system efficiency.

Viewed from a first example configuration, there is provided a data processing apparatus comprising: processing circuitry to execute instructions relating to an active virtual processor in a plurality of virtual processors; exception control circuitry to receive an external exception associated with a target virtual processor in the plurality of virtual processors and when the target virtual processor is other than the active virtual processor, to issue a doorbell exception to cause a scheduling operation to schedule the target virtual processor to be the active virtual processor; and storage circuitry to store an indication of a set of masked virtual processors, wherein the scheduling operation is adapted to disregard doorbell exceptions in respect of the set of masked virtual processors.

Viewed from a second example configuration, there is provided a data processing method comprising: executing instructions relating to an active virtual processor; scheduling the active virtual processor from among a plurality of virtual processors; receiving an external exception associated with a target virtual processor in the plurality of virtual processors and when the target virtual processor is other than the active virtual processor, issuing a doorbell exception to cause a scheduling operation to schedule the target virtual processor to be the active virtual processor; and storing an indication of a set of masked virtual processors, wherein the scheduling operation is adapted to disregard doorbell exceptions in respect of the set of masked virtual processors.

Viewed from a third example configuration, there is provided a computer program for controlling a host data processing apparatus to provide an instruction execution environment comprising: processing programming logic to execute instructions relating to an active virtual processor in a plurality of virtual processors; exception control programming logic to receive an external exception associated with a target virtual processor in the plurality of virtual processors and when the target virtual processor is other than the active virtual processor, to issue a doorbell exception to cause a scheduling operation to schedule the target virtual processor to be the active virtual processor; and a data structure to store an indication of a set of masked virtual processors, wherein the scheduling operation is adapted to disregard doorbell exceptions in respect of the set of masked virtual processors.

The present technique will be described further, by way of example only, with reference to embodiments thereof as illustrated in the accompanying drawings, in which.

Before discussing the embodiments with reference to the accompanying figures, the following description of embodiments and associated advantages is provided.

In accordance with one example configuration there is provided a data processing apparatus comprising: processing circuitry to execute instructions relating to an active virtual processor; exception control circuitry to receive an external exception associated with a target virtual processor in the plurality of virtual processors and when the target virtual processor is other than the active virtual processor, to issue a doorbell exception to cause a scheduling operation to schedule the target virtual processor to be the active virtual processor; and storage circuitry to store an indication of a set of masked virtual processors, wherein the scheduling operation is adapted to disregard doorbell exceptions in respect of the set of masked virtual processors.

In the above example configuration, a set of masked virtual processors is stored. The masking of a virtual processor is a state that indicates that the exception control circuitry should disregard doorbell exceptions that are generated in respect of the masked virtual processor. Such state could be implemented by management software such as a hypervisor. A virtual processor can become masked as a result of a doorbell exception being generated for that virtual processor. Consequently, the process of scheduling a virtual processor for execution can be inhibited rather than being continually performed, thereby improving efficiency of the system. One of ordinary skill in the art will appreciate that such embodiments are particularly elegant. The need to use locking mechanisms to obtain access to shared restricted resources can be reduced if not eliminated. It will be appreciated that the storage of an indication of a set of masked processors can be implemented by storing the set of masked processors themselves or by storing a set of unmasked processors and assuming that any processors not in that set are masked.

In some embodiments, when the scheduling operation has scheduled the target virtual processor to be the active virtual processor, the exception control circuitry is adapted to store the target virtual processor in the set of masked virtual processors. In such embodiments, the target virtual processor can be stored in the set of masked virtual processors either before or after the target virtual processor has been scheduled to be the active processor provided the doorbell exception that causes such scheduling has been received. Consequently, if a doorbell exception has been received and the target virtual processor has been scheduled, further doorbell exceptions to the same virtual processor can be issued, but will not cause the scheduling operation to become active. This improves efficiency by inhibiting the scheduling operation from being repeatedly activated.

In some embodiments, when the processing circuitry changes the active virtual processor, the active virtual processor associated with the active virtual processor is removed from the set of masked virtual processors. In such embodiments, any limitations placed on doorbell exceptions in respect of a virtual processor are removed when that virtual processor ceases to be resident (e.g. active).

In some embodiments, when the processing circuitry changes the active virtual processor, the doorbell exception is cleared. In some embodiments, a "race condition" can occur where a virtual processor is in the process of being made resident at the same time that a doorbell exception is raised. In such cases, the scheduling operation could be activated in order to schedule the virtual processor even though the virtual processor was already in the process of being activated. Clearly such a scenario is inefficient. Accordingly, such embodiments inhibit this situation from arising by clearing the doorbell exception made in respect of a virtual processor when that processor is being made active.

In some embodiments, the data processing apparatus comprises exception data storage to store data relating to the external exception, wherein in response to receiving the external exception, the exception control circuitry is adapted to store the data relating to the external exception in the exception data storage in association with the target virtual processor. By storing the data relating to an exception (e.g. the data in memory where the data is stored, or the raw data itself) in the exception data storage, the exception can be handled or responded to at a later time.

In some embodiments, when the processing circuitry changes the active virtual processor to be the target virtual processor, the processing circuitry executes an exception handling routine for each item of exception data stored in the exception data storage associated with the active virtual processor. An exception handling routine provides a series of instructions for responding to an exception. Since a non-resident virtual processor cannot immediately respond to an exception (even if the exception is intended for/associated with that virtual processor), the data relating to the exception can be stored. A doorbell exception can then be issued to schedule the virtual processor to be made active. Once the virtual processor has been made active, an exception handling routine can then be executed for each exception—thereby making it possible for the virtual processor to respond (albeit slightly later than if the virtual processor was resident) to the exception.

In some embodiments, the apparatus is responsive to an instruction to add the active virtual processor to the set of masked virtual processors when the active virtual processor is suspended. This makes it possible for a virtual processor to specifically request that it is added to the masked list as soon as it made non-resident (e.g. suspended after being active). Consequently, doorbell exceptions will not cause the virtual processor to be scheduled. This could be useful when the virtual processor is already programmed to become active again (e.g. if it periodically activates).

In some embodiments, at most one doorbell exception is generated in respect of an inactive virtual processor until the inactive virtual processor becomes the active virtual processor. Consequently, the scheduling operation only attempts to schedule the inactive virtual processor a maximum of once before that virtual processor becomes active again. Since further scheduling attempts to schedule the virtual processor may have no further effect on the schedule, this would prevent the scheduling operation from being performed repeatedly.

In some embodiments, the plurality of virtual processors comprises a management virtual processor to perform the scheduling operation. Such embodiments therefore require the management virtual processor to become active in order to schedule other virtual processors. In such situations, the underlying problem that the present technique solves is compounded, since receiving a doorbell exception causes the active (resident) virtual processor to be suspended, in order to activate the management virtual processor, to handle the doorbell exception, to re-suspend the management virtual processor in order to resume the previously suspended virtual processor. If this happens multiple times, for little or no benefit, then clearly the overall efficiency of the system will decline.

In some embodiments, the scheduling operation is part of a hypervisor. A hypervisor system makes it possible to run a plurality of guest operating systems simultaneously. Each operating system may have its own software and may be given the appearance of being the sole operating system executing on the hardware. The hypervisor takes care of scheduling between the operating systems and handles hardware interfaces in order to determine which guest operating system (or which application under which guest operating system) data relating to hardware should be directed.

In some embodiments, the processing circuitry is one of a plurality of processing circuitries, each adapted to execute instructions relating to one of a plurality of active virtual processors comprising the active virtual processor. The scheduling operation (if present) could operate on a per-processor basis, or could operate for the overall system—scheduling virtual processors to run on any available physical processor where appropriate.

Particular embodiments will now be described with reference to the figures.

Figure 1:
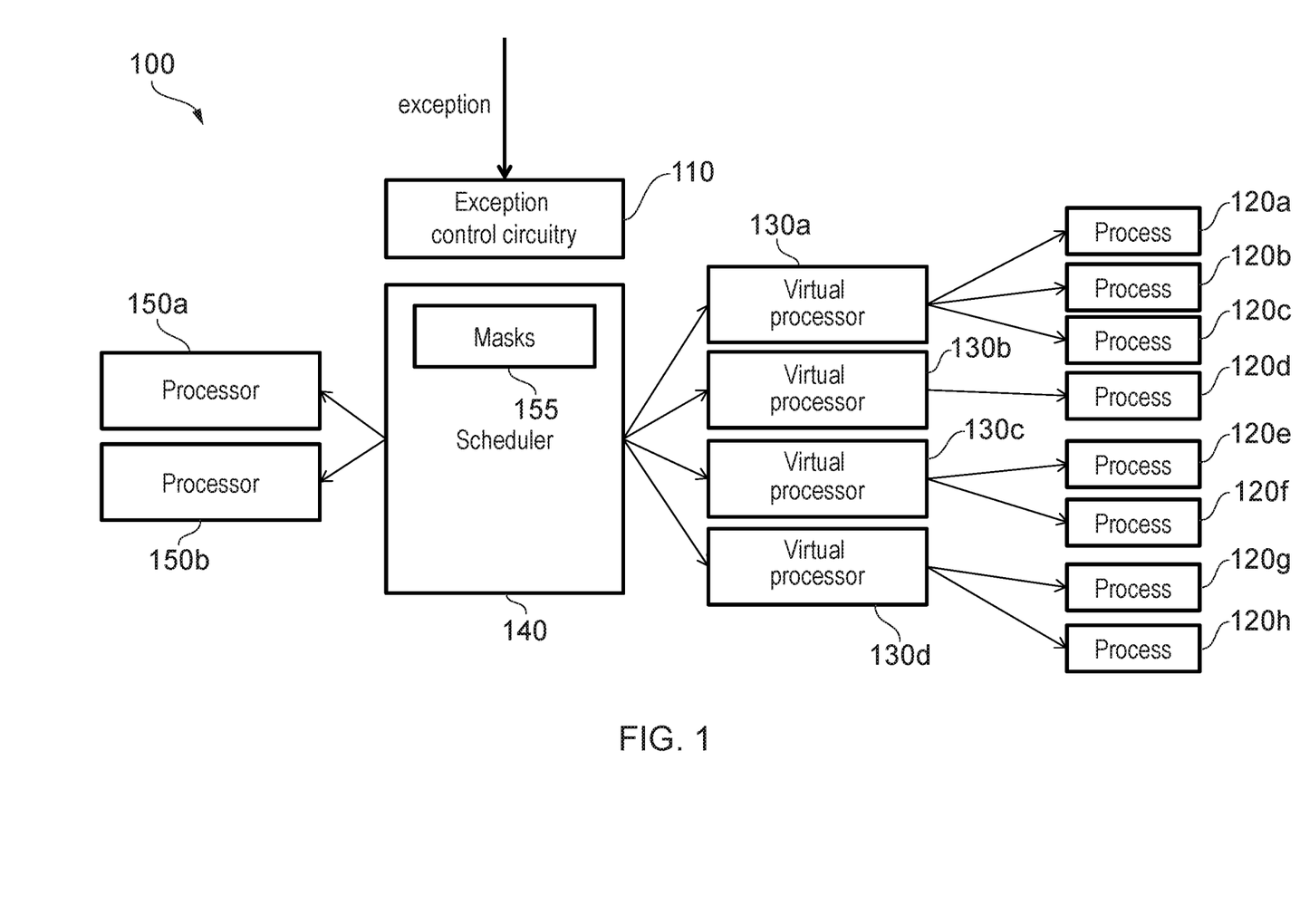
FIG. 1 illustrates a data processing apparatus in accordance with some embodiments.

FIG. 1 illustrates a data processing apparatus 100 in accordance with some embodiments. The data processing apparatus 100 includes exception control circuitry 110 that receives an exception. Such an exception could be generated as a consequence of an interface with hardware, for instance. For example, the exception could be an indicator that a hard disk has acquired information requested by software (e.g. a process 120 executing on a virtual processor 130). The apparatus 100 also includes a scheduler 140 that determines which virtual processor 130 is to execute on which physical processor 150. Since there are two physical processors 150A and 150B and four virtual processors 130A, 130B, 130C and 130D, at most two of the virtual processors 130 can execute on the processors 150 at a time. Consequently, the scheduler 140 determines which virtual processor 130 executes on each processor 150 at a particular time. In addition, in combination with the exception control circuitry 110, the scheduler helps to handle the propagation of exceptions. In particular, when an exception is received by the exception control circuitry 110 the scheduler 140 schedules the virtual processor 130 that is associated with the incoming exception to execute on one of the processors 150. For example, if a particular virtual processor 130B is waiting for the results from requesting data from a hard disk, then the exception control circuitry 110 will receive the incoming exception and the scheduler 140 will schedule the virtual processor 130B to execute on one of the processors 150 in the near future so as to handle the exception. Since the exception is not fully handled immediately, data relating to the exception can be stored for later handling (discussed below). In this embodiment, the scheduler includes a set of masks 155. These masks can be used in order to indicate that a particular virtual processor 130 is not to be scheduled for execution by one of the processors 150. This could occur, for instance, if the virtual processor 130 in question has already been scheduled for execution. In this case, running the scheduler in order to determine when the virtual processor 130 should be scheduled may be a meaningless task. Furthermore, such a task could be wasteful of resources in the apparatus 100.

In some embodiments, the scheduler 140 is a process 120 that executes on one of the virtual processors 130. Consequently, running the scheduler 140 in order to determine how an incoming exception received by the exception control circuitry 110 should be routed or in order to perform a scheduling operation to determine how the schedule should be adjusted as a consequence of such an exception, or merely determining which of the virtual processors 130 is next to execute on a particular processor 150 requires the scheduler 140 to be activated on one of the processors 150. It will be appreciated, of course, that this inhibits other processes 120 from being executed while the scheduler 140 performs its task. As a consequence, limiting the period of time for which the scheduler 140 executes can lead to an improvement of efficiency of the overall apparatus 100.

Figure 2:
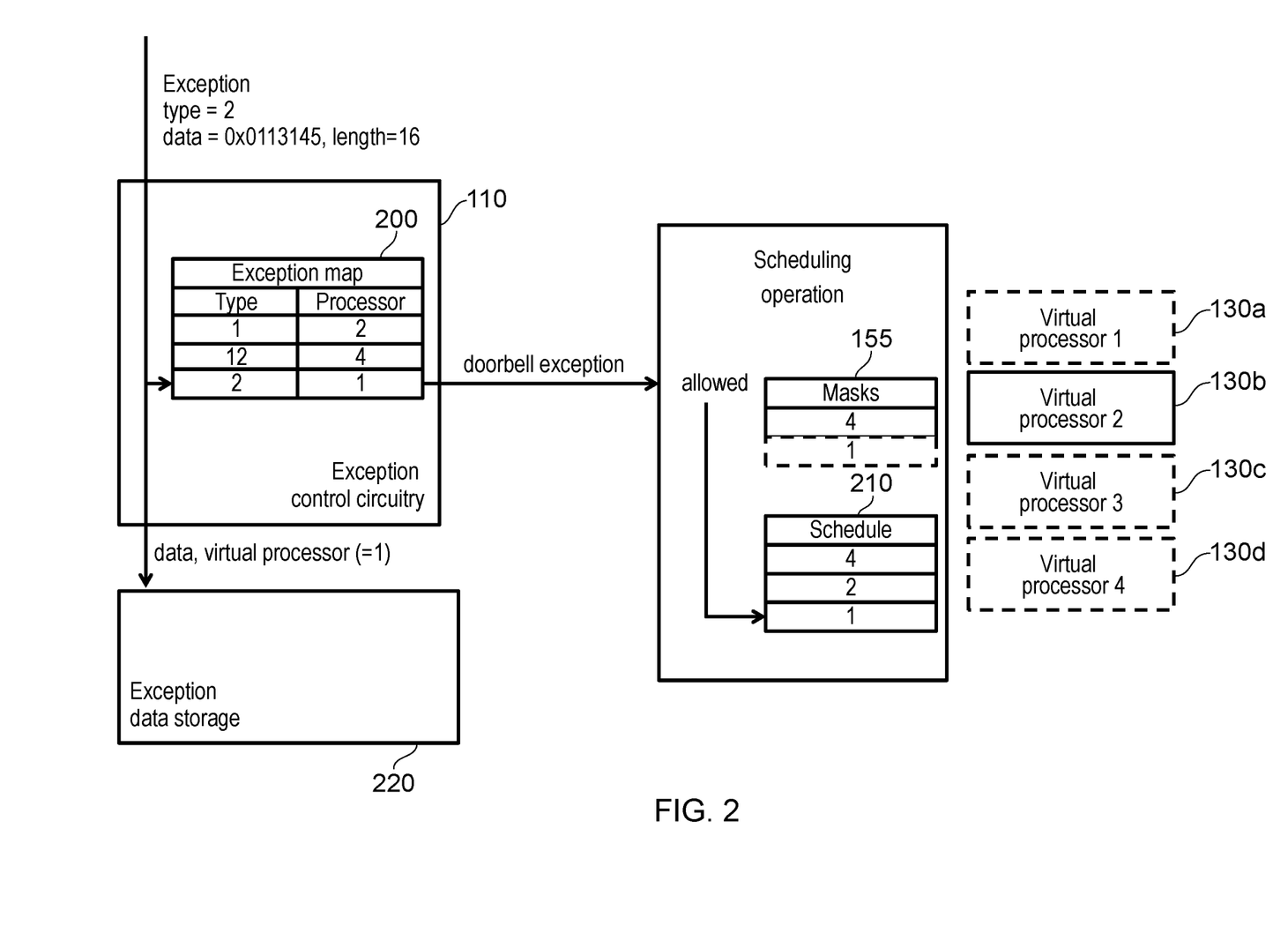
FIG. 2 illustrates, in accordance with some embodiments, how the routing of an exception occurs.

FIG. 2 illustrates, in accordance with some embodiments, how the routing of an exception occurs. As before, an exception is received by the exception control circuitry 110. In this case, the exception is of type '2' and has data stored at a memory address '0x0113145'. The length of the data is noted as being 16 (e.g. bytes). The exception control circuitry 110 uses an exception map 200 to associate a particular type of exception with a virtual processor. It will be appreciated, of course, that other methods of association of exceptions can be performed. For instance, the exception map 200 may associate an exception with a particular process on a virtual processor. In other embodiments, there may be other means of determining how the exception is to be routed. In the current example, the exception map 200 indicates that for an exception of type 2, the exception is to be routed to virtual processor 1. At present, virtual processor 1 is suspended (as indicated by the dashed lines surrounding virtual processor 1 in FIG. 2). Consequently, the exception control circuitry 110 generates a doorbell exception which is passed to the scheduling operation. The scheduling operation could be performed by a scheduler 140 such as dedicated scheduling circuitry, a scheduler in the form of a process 120 that executes on one of the virtual processors 130, or a combination of the two. In any event, the doorbell exception is received by the scheduling operation. A set of masks 155 is checked, which indicates a set of masked virtual processors. Since virtual processor 1 is not found in the set of masks, the doorbell exception is allowed (i.e. reacted to) and the virtual processor 1 is thereby added to the schedule of virtual processors 210 to be executed. At the same time, the exception control circuitry 110 stores the exception data, and the identifier of the associated virtual processor (i.e. virtual processor 1) in exception data storage 220. Accordingly, when virtual processor 1 130A is scheduled to be executed, the data associated with the exception can be acquired from the exception data storage 220.

Note that in this particular embodiment, the act of responding to the doorbell exception causes the virtual processor 1 130A to be added to the set of masked virtual processors. Consequently, further doorbell exceptions that are received in respect of virtual processor 1 will not be acted upon.

In other embodiments, the set of masks 155 comprises a set of unmasked virtual processors, which are removed from the set when the processor becomes masked. Here, the absence of a virtual processor from the list (rather than its presence) indicates that the virtual processor has been masked.

Figure 3:
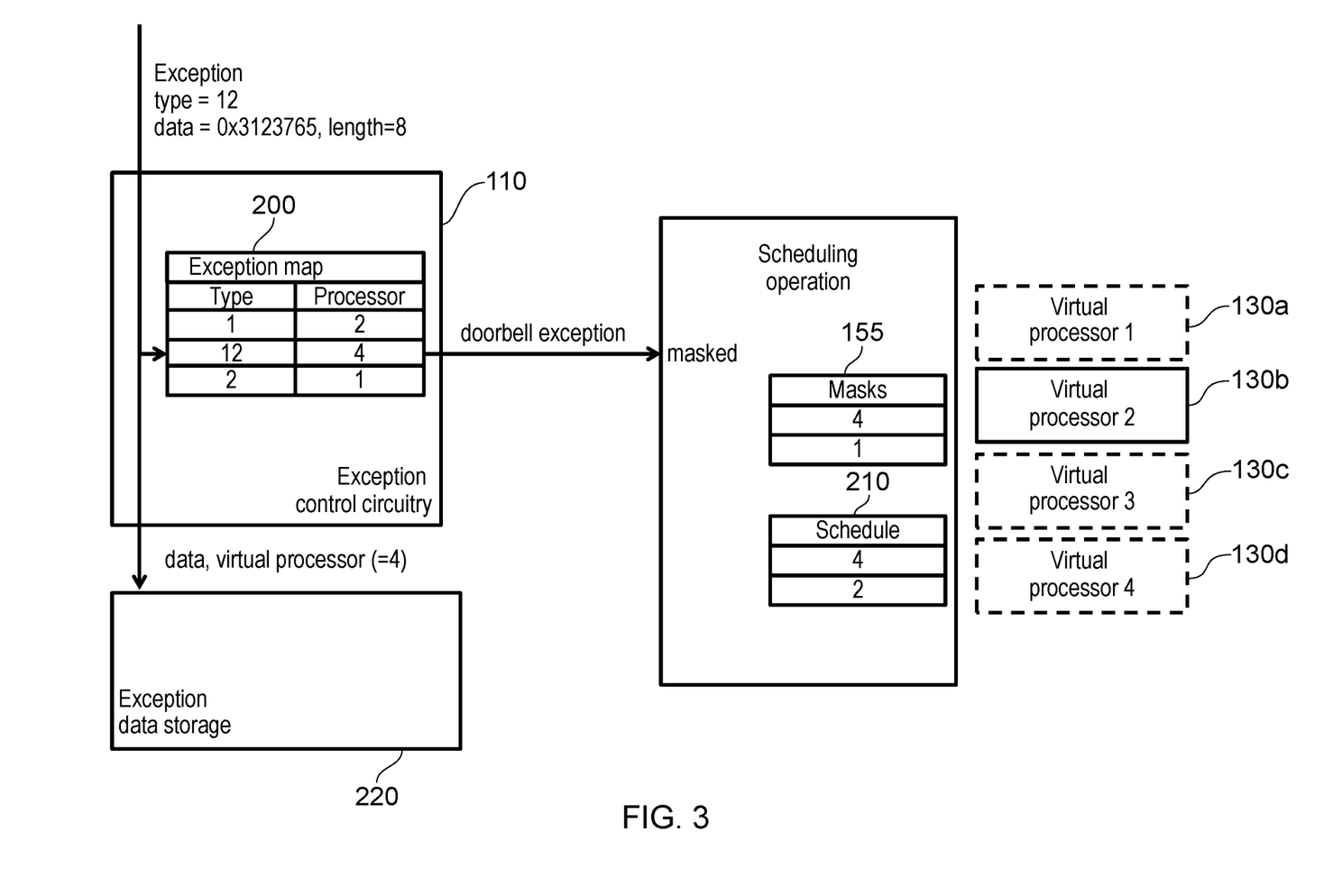
FIG. 3 shows a further example of routing an exception in accordance with some embodiments.

FIG. 3 shows a second example of routing an exception in accordance with some embodiments. In the example of FIG. 3, an exception of type '12' is received. The data associated with this exception is stored at a memory address '0x3123765'. The data is also said to have a length of 8 (e.g. bytes). Here, the exception control circuitry 110 again receives the exception and notes in the exception map 200 that an exception of type 12 is associated with virtual processor 4 130D. Since virtual processor 4 130D is again inactive, this results in a doorbell exception being generated and passed to the scheduling operation. In this case, the set of masks 155 includes virtual processor 4 130D. Consequently, the doorbell exception, although generated, is masked. Consequently, the scheduling operation does not perform further scheduling in respect of virtual processor 4 130D. It will be noted, that the schedule 210 already indicates that virtual processor 4 130D is the next virtual processor to be executed. Consequently, the masking of the doorbell exception by the scheduling operation has obviated the need to run scheduling which would have no beneficial effect on the schedule 210.

Figure 4:
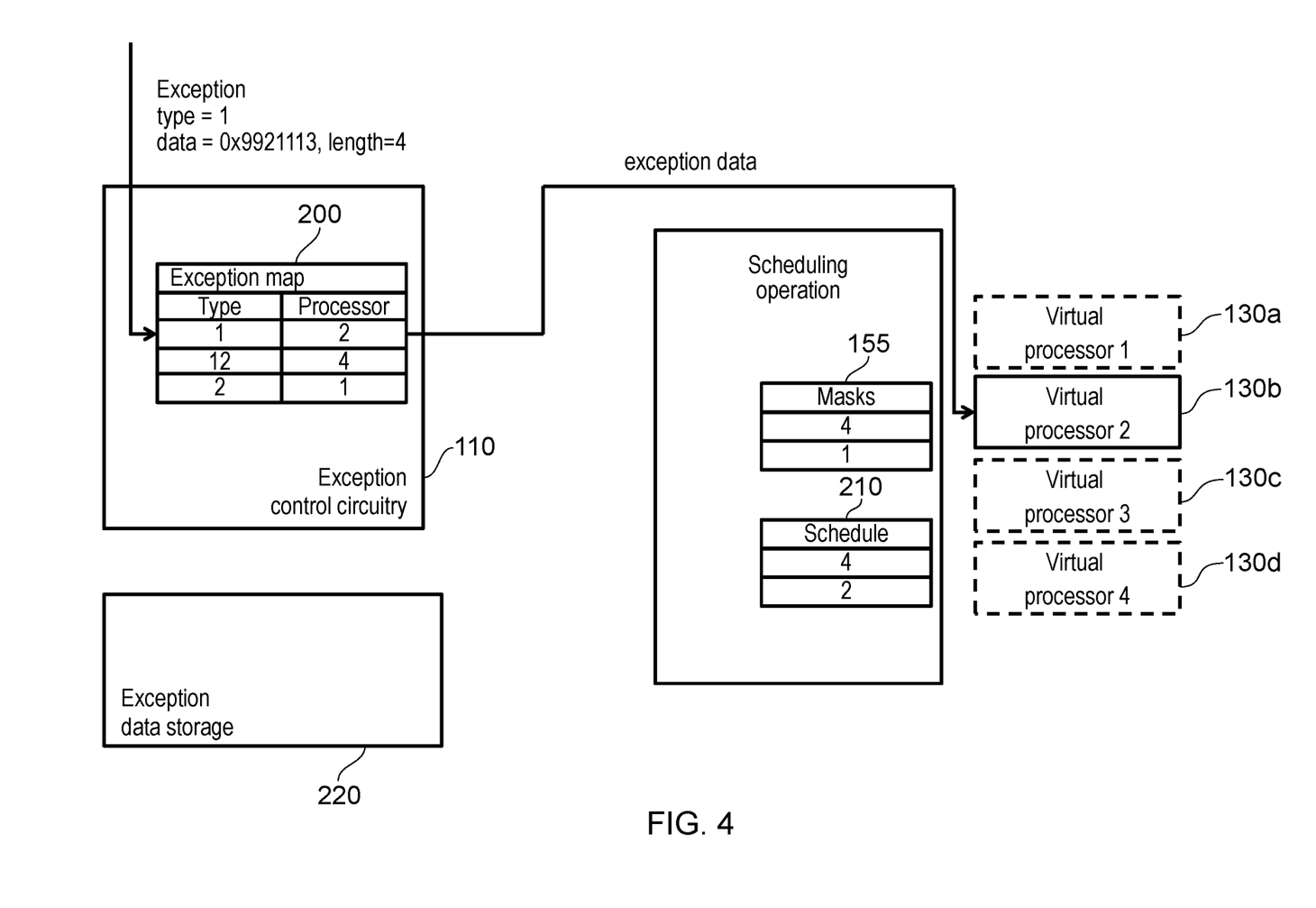
FIG. 4 illustrates a further example of routing an exception in accordance with some embodiments.

FIG. 4 illustrates a further example in accordance with some embodiments. Here, an exception of type '1' is received by the exception control circuitry 110. The exception map 200 indicates that such an exception is to be handled by virtual processor 2. In this case, virtual processor 2 is resident (e.g. active). Consequently, the exception can be routed directly to the virtual processor 2 130B and there is no need for a doorbell exception to occur.

Figure 5:
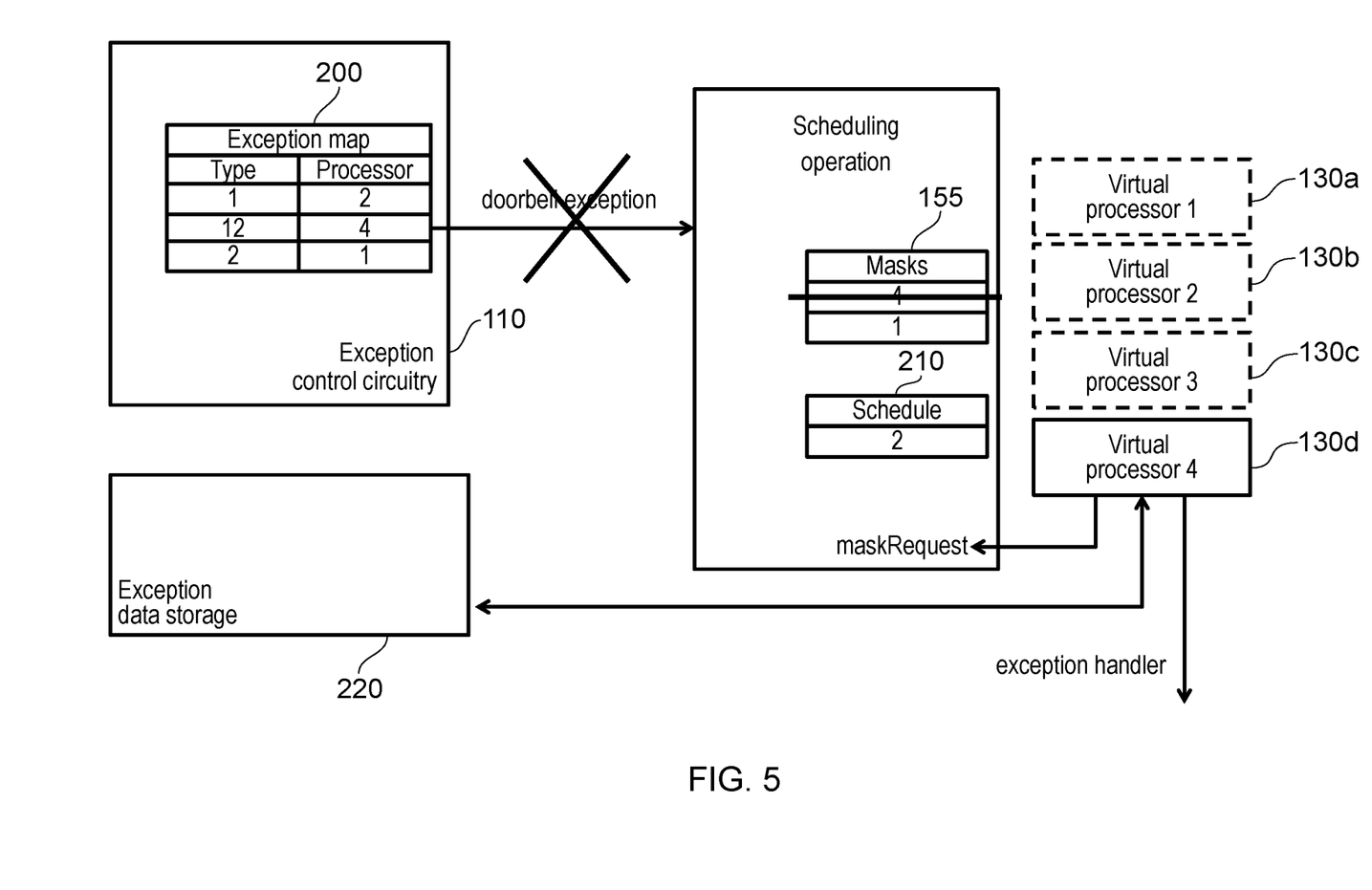
FIG. 5 illustrates an example where the active virtual processor is changed in accordance with some embodiments.

FIG. 5 illustrates an example in which the active virtual processor is changed from virtual process 2 130B to virtual processor 4 130D. The activation of virtual processor 4 130D causes virtual processor 4 130D to be removed from the set of masks 155. Accordingly, unless further action is taken, when virtual processor 4 130D is suspended (i.e. no longer active on the processors 150), a doorbell exception issued in respect of virtual processor 4 130D will be responded to by the scheduling operation. Being newly activated, the virtual processor 4 130D accesses the exception data storage 220 to determine whether any exceptions have been received for it while it was suspended. Furthermore, any data associated with those exceptions is also acquired. The virtual processor 4 130D then executes an exception handler for each of the stored exceptions. In addition, in this example, the new activation of virtual processor 4 130D causes the doorbell exception to be cleared. Accordingly, this helps to avoid a race condition which can occur during the activation of a virtual processor 130 in which a virtual processor 130 is in the process of being activated as a doorbell exception for that virtual processor is raised. In this case, this can cause the scheduling operation to be executed to cause the virtual processor to be added to the schedule when that virtual processor is already in the process of being activated. Clearly this would delay the virtual processor from being made resident and therefore able to respond directly to exceptions and thus can be inhibited by clearing the doorbell exception that occurs in respect of virtual processor 4 as virtual processor 4 is being made active. Finally, as also shown in FIG. 5, virtual processor 4 130D makes a mask request to the scheduling operation. This will cause virtual processor 4 130D to be added to the list of masks 155 when the processor is suspended. Consequently, the scheduling operation will not execute scheduling for virtual processor 4 130D in response to any doorbell exception when the virtual processor 4 130D is suspended. This could be useful if, for instance, virtual processor 4 130D is configured to be added to the schedule every period of time (e.g. a short period of time that would enable the virtual processor 4 130D to respond to exceptions in a timely manner without being explicitly added to the schedule as a consequence of doorbell exceptions).

Figure 6:
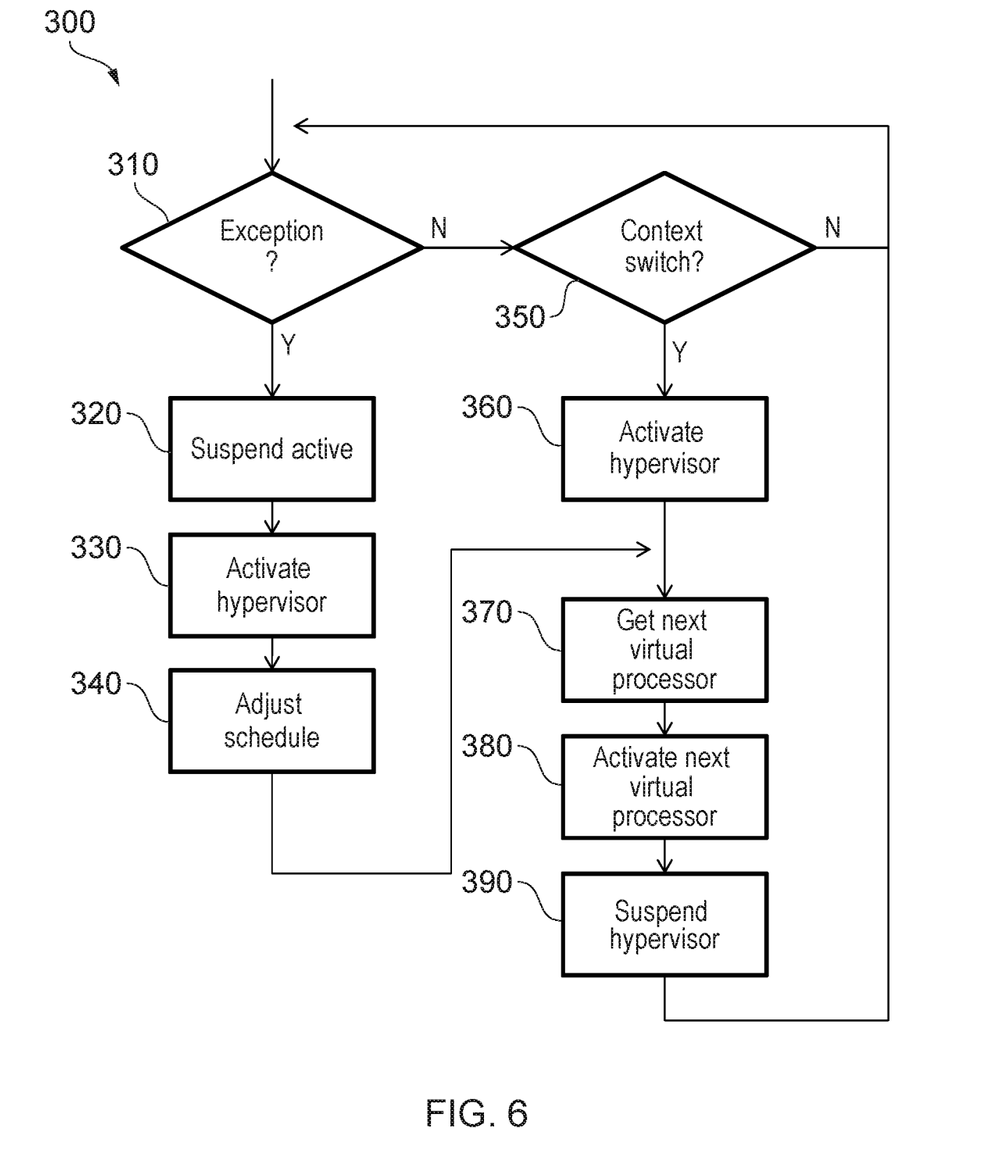
FIG. 6 illustrates a flow chart that indicates a process of using a hypervisor that operates on one of the virtual processors in accordance with some embodiments.

FIG. 6 illustrates a flow chart 300 that indicates a process of using a hypervisor that operates on one of the virtual processors 130. At a step 310, the apparatus determines whether an exception has been received or not. Such a determination can be made by the exception control circuitry 110. If so, then at step 320, the active virtual processor 130 is suspended and the virtual process comprising the hypervisor (e.g. management software or scheduling software) is activated. At a step 340, the scheduling operation is performed thereby causing the virtual processor that is associated with the incoming exception to be added to the schedule. The process then proceeds to a step 370. Alternatively, at step 310, if an exception is not received, then at step 350 it is determined whether it is time for a context switch to occur. If not, then the process returns to step 310. If a context switch is to occur, then at step 360 the hypervisor is activated. At step 370, either after having activated the hypervisor for a context switch or after having adjusted the schedule as a consequence of an exception occurring, the next virtual processor to be executed is determined by the hypervisor. At a step 380 the next virtual processor to be executed is then activated and at a step 390, the virtual processor associated with the hypervisor is suspended. The process then returns to step 310.

Figure 7:
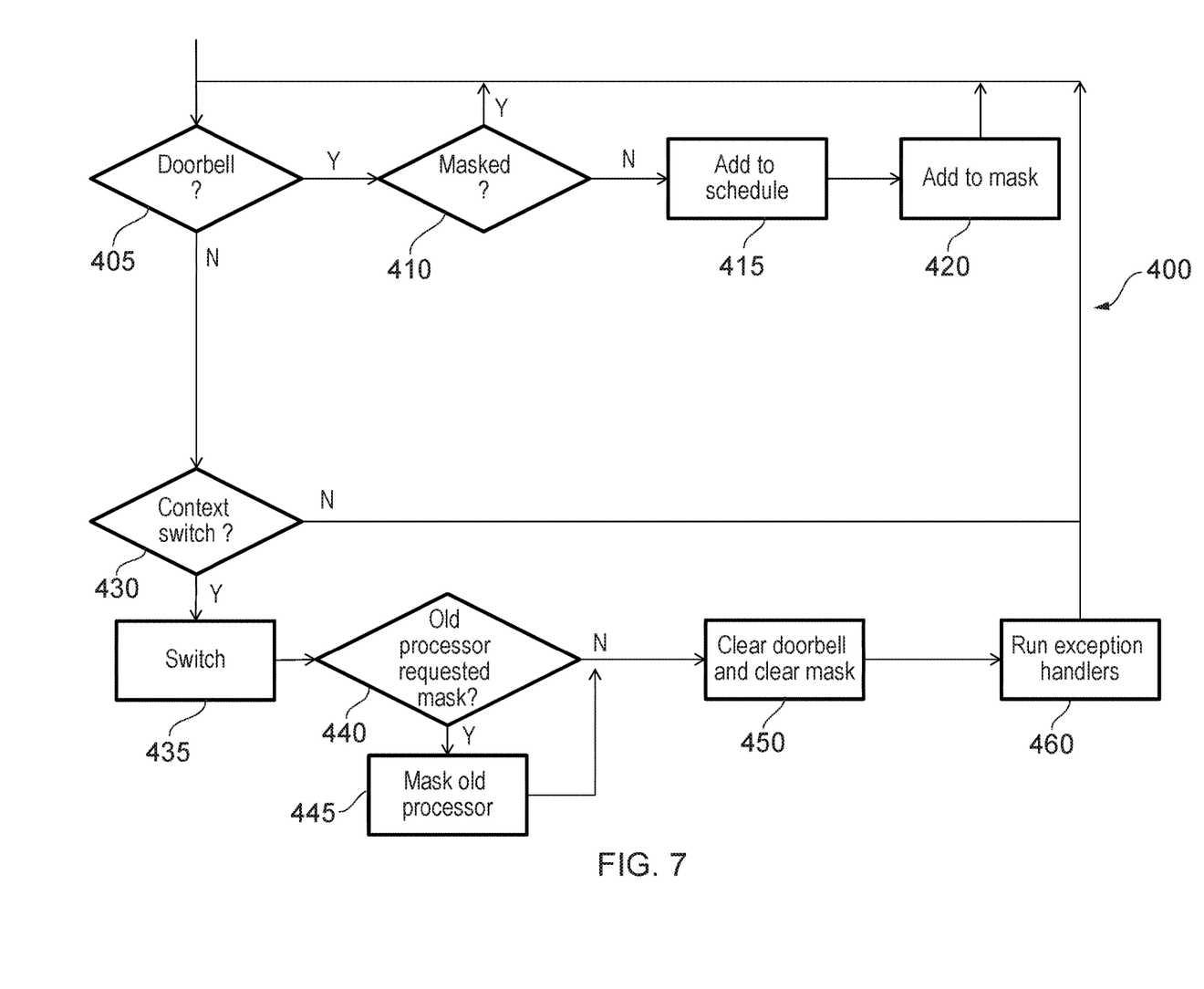
FIG. 7 illustrates a method of data processing in accordance with some embodiments.

FIG. 7 illustrates a method of data processing using flowchart 400 in accordance with some embodiments. At a step 405, it is determined whether a doorbell exception has been raised. If so, at step 410, it is determined whether the virtual processor 130 associated with the doorbell exception has been masked. If so, then the doorbell exception has no effect and the processor returns to step 405. If not, then at step 415, the virtual processor 130 associated with the doorbell exception is added to the schedule and at step 420, the virtual processor associated with the doorbell exception is added to the set of masks. This therefore inhibits further doorbell exceptions from scheduling the virtual processor. The process then returns to step 405. If a doorbell exception is not occurring at step 405 then at step 430 it is determined whether a context switch is due to occur. If not, then the process returns to step 405. If so, then at step 435 the active virtual processor 130 is changed. This process corresponds approximately with steps 350 to 390 shown in FIG. 6. If, at step 440, it is determined that the previous virtual processor (the one that was active before the context switch occurred at step 435) made a mask request, then at step 445 the old virtual processor is masked. Consequently, the virtual processor 130 that made the mask request (i.e. the newly suspended virtual processor 130), will not be scheduled as a result of doorbell exceptions occurring until it is removed from the set of masked virtual processors (e.g. if it becomes active and suspended again without requesting being masked). In either case, at step 450 the doorbell exception is cleared and the mask associated with the new virtual processor 130, if it is present, is cleared. Then, at step 460, exception handlers for any exceptions stored in the exception data storage 220 in respect of the newly activated virtual processor are executed. The process then returns to step 405.

Figure 8:
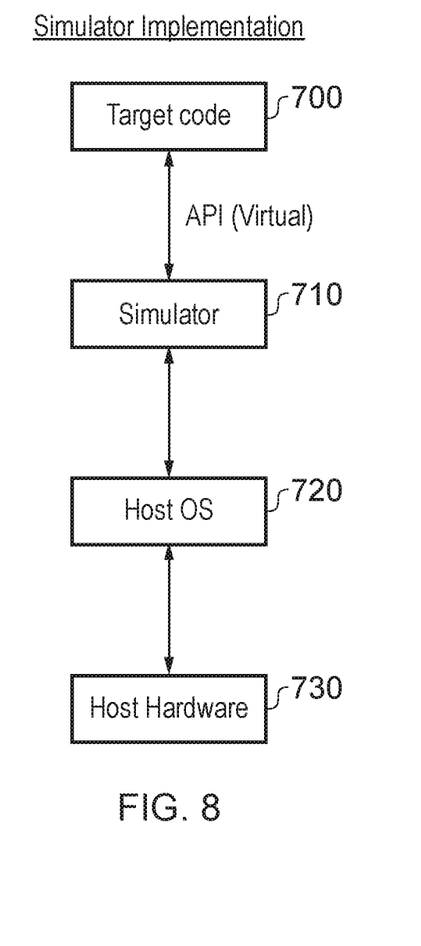
FIG. 8 illustrates a simulator implementation in accordance with some embodiments.

FIG. 8 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 (which may include applications, operating systems and a hypervisor) which is the same as the application program interface of the hardware architecture being modelled by the simulator program 710. Thus, the program instructions of the target code 700, including the behavior of all or part of the data processing apparatus 100—particularly the scheduler 140 and exception handling circuitry 110 described above, may be executed from within the instruction execution environment using the simulator program 710, so that a host computer 730 which does not actually have the hardware features of the data processing apparatus 100 discussed above can emulate these features.

Accordingly, it can be seen that by the use of masks in order to prevent doorbell exceptions from adjusting the schedule it is possible to create a situation in which a scheduling operation will only be executed once for each virtual processor until such time as that virtual processor is made active. This can therefore reduce the number of times that the scheduling operation is made to execute. Where management software occupies one of the virtual processors (i.e. where the scheduling operation is executed using one of the virtual processors) this can have a significant benefit by reducing the extent to which virtual processors must be swapped in and out. Even where the scheduling operation is part of a dedicated processor or its own circuitry, this can reduce inefficiency as a consequence of a scheduling operation being repeatedly executed with no benefit. Consequently, the above described techniques are beneficial in improving the efficiency of a system by limiting the extent to which scheduling operations that have limited or no effect can be executed.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A data processing apparatus comprising:
   processing circuitry to execute instructions relating to an active virtual processor in a plurality of virtual processors;
   exception control circuitry to receive an external exception associated with a target virtual processor in the plurality of virtual processors and when the target virtual processor is other than the active virtual processor, to issue a doorbell exception to cause a scheduling operation to schedule the target virtual processor to be the active virtual processor; and
   storage circuitry to store an indication of a set of masked virtual processors, wherein
   the scheduling operation is adapted to disregard doorbell exceptions with respect to the set of masked virtual processors.

2. A data processing apparatus according to claim 1, wherein
   when the scheduling operation has scheduled the target virtual processor to be the active virtual processor, the exception control circuitry is adapted to store the target virtual processor in the set of masked virtual processors.

3. A data processing apparatus according to claim 2, wherein
   when the processing circuitry changes the active virtual processor to be the target virtual processor, the target virtual processor is removed from the set of masked virtual processors.

4. A data processing apparatus according to claim 1, wherein
   when the processing circuitry changes the active virtual processor to be the target virtual processor, the doorbell exception associated with the target virtual processor is cleared.

5. A data processing apparatus according to claim 1, comprising:
   exception data storage to store data relating to the external exception, wherein
   in response to receiving the external exception, the exception control circuitry is adapted to store the data relating to the external exception in the exception data storage in association with the target virtual processor.

6. A data processing apparatus according to claim 5, wherein
   when the processing circuitry changes the active virtual processor to be the target virtual processor, the processing circuitry executes an exception handling routine for each item of exception data stored in the exception data storage associated with the active virtual processor.

7. A data processing apparatus according to claim 1, wherein
   the apparatus is responsive to an instruction, to add the active virtual processor to the set of masked virtual processors when the active virtual processor is suspended.

8. A data processing apparatus according to claim 1, wherein
   at most one doorbell exception is generated with respect to each inactive virtual processor until that inactive virtual processor becomes the active virtual processor.

9. A data processing apparatus according to claim 1, wherein
   the plurality of virtual processors comprises a management virtual processor to perform the scheduling operation.

10. A data processing apparatus according to claim 9, wherein
    the scheduling operation is part of a hypervisor.

11. A data processing apparatus according to claim 1, wherein
    the processing circuitry is one of a plurality of processing circuitries, each adapted to execute instructions relating to one of a plurality of active virtual processors comprising the active virtual processor.

12. A data processing method comprising:
    executing instructions relating to an active virtual processor;
    scheduling the active virtual processor from among a plurality of virtual processors;
    receiving an external exception associated with a target virtual processor in the plurality of virtual processors and when the target virtual processor is other than the active virtual processor, issuing a doorbell exception to cause a scheduling operation to schedule the target virtual processor to be the active virtual processor; and storing an indication of a set of masked virtual processors, wherein the scheduling operation is adapted to disregard doorbell exceptions with respect to the set of masked virtual processors.

13. A non-transitory storage medium storing computer-readable code for controlling a host data processing apparatus to provide an instruction execution environment comprising:

processing programming logic to execute instructions relating to an active virtual processor in a plurality of virtual processors;

exception control programming logic to receive an external exception associated with a target virtual processor in the plurality of virtual processors and when the target virtual processor is other than the active virtual processor, to issue a doorbell exception to cause a scheduling operation to schedule the target virtual processor to be the active virtual processor; and a data structure to store an indication of a set of masked virtual processors, wherein the scheduling operation is adapted to disregard doorbell exceptions with respect to the set of masked virtual processors.

* * * * *